United States Patent

Merry

[15] 3,648,941

[45] Mar. 14, 1972

[54] STATIONARY PINCH PAD

[72] Inventor: Donald D. Merry, Westland, Maine

[73] Assignee: Rozinante Electronic Corporation, Plymouth, Mich.

[22] Filed: Mar. 20, 1970

[21] Appl. No.: 21,421

[52] U.S. Cl. ....................242/55.19 A, 274/4 C, 179/100.2 Z

[51] Int. Cl. .......................................................B65h 17/48

[58] Field of Search ...............226/89, 90, 118, 168; 274/4 B, 274/4 C, 4 D, 4 E, 4 F; 242/194, 197, 198, 199, 200, 55.17–55.21; 179/100.2 Z

[56] References Cited

UNITED STATES PATENTS

| | | | |
|---|---|---|---|
| 3,542,303 | 11/1970 | Auld | 242/197 X |
| 3,516,616 | 6/1970 | Adell | 242/55.19 A |
| 3,289,963 | 12/1966 | Taylor et al. | 242/197 X |
| 3,424,360 | 1/1969 | Trott | 226/168 |

*Primary Examiner*—Allen N. Knowles
*Attorney*—Whittemore, Hulbert & Belknap

[57] ABSTRACT

A tape cartridge having a rotatable spool with a reel of magnetic tape in endless array is provided. The spool is mounted in a casing which includes guide means over which a loop portion of the tape is guided for transportation past a reproducing head. The drive means for the tape includes a power-driven rotating wheel and a fixed drive member or pinch pad in the casing in alignment with the driven wheel and over which the tape slides during transportation.

3 Claims, 5 Drawing Figures

PATENTED MAR 14 1972 3,648,941

INVENTOR.
DONALD D. MERRY

BY
Whittemore, Hulbert & Belknap
ATTORNEYS

STATIONARY PINCH PAD

BACKGROUND OF THE INVENTION

Magnetic tape players have recently come into widespread use as entertainment devices in automobiles. Such players generally comprise a playback system including a reproducing head, an amplifier, power supply and speaker system. The magnetic tape is provided in a cartridge as a self-contained unit. A number of different cartridges may be stored in the automobile and used as desired. In order to use a cartridge, it is merely inserted into a slotlike opening in the playback device. The reel of tape, which is arranged in an endless fashion within the cartridge, will play continuously until the cartridge is removed.

The cartridge has opening means in one end thereof. These opening means are on the forward part of the cartridge when the cartridge is inserted into the slot. The reproducing head is received through the opening means and presses against the tape. Additional opening means are provided for insertion of a power-driven rotating drive wheel. Conventionally, a second rotating wheel has been provided in the casing for abutment with the power-driven wheel with the tape therebetween. This has been the means for transporting the tape for playback purposes.

In accordance with the present invention, a fixed drive element is provided in the cartridge for abutment with the power-driven wheel. The tape slides over a slippery surface of the fixed member, the fixed member not rotating as has been the case in the past. This structure is advantageous over a rotatable wheel from several aspects. Firstly, it is considerably less expensive, being capable of manufacture and sale for less than half the cost of rotatable wheels. Further, elimination of a rotating wheel improves performance from the standpoint of elimination of a moving part and elimination of the eccentricity which is inherent in a rotating component. Such eccentricity leads to the malfunction termed "wow" which is a rapid change in volume. The fixed drive element is adaptable to most standard cartridges and further standardizes the pinch point configuration for all cartridges with regard to area and amount of drive wheel contact.

SUMMARY OF THE INVENTION

The tape cartridge contains a rotatable spool having a reel of magnetic tape in endless array. The spool is mounted in a casing. Guide means are provided in the casing over which a loop portion of the tape is guided for transportation past a reproducing head. The drive means for the tape comprise an opening in the casing for insertion of a power-driven rotating wheel. A fixed drive member is mounted in the casing in alignment with the opening for abutment of a surface thereof with the power-driven rotating wheel with a tape section therebetween. The abutting surface is slippery to facilitate the tape sliding thereover upon being driven by the rotating power-driven wheel.

IN THE DRAWING

Figures 1, 2, 3, 4, 5:
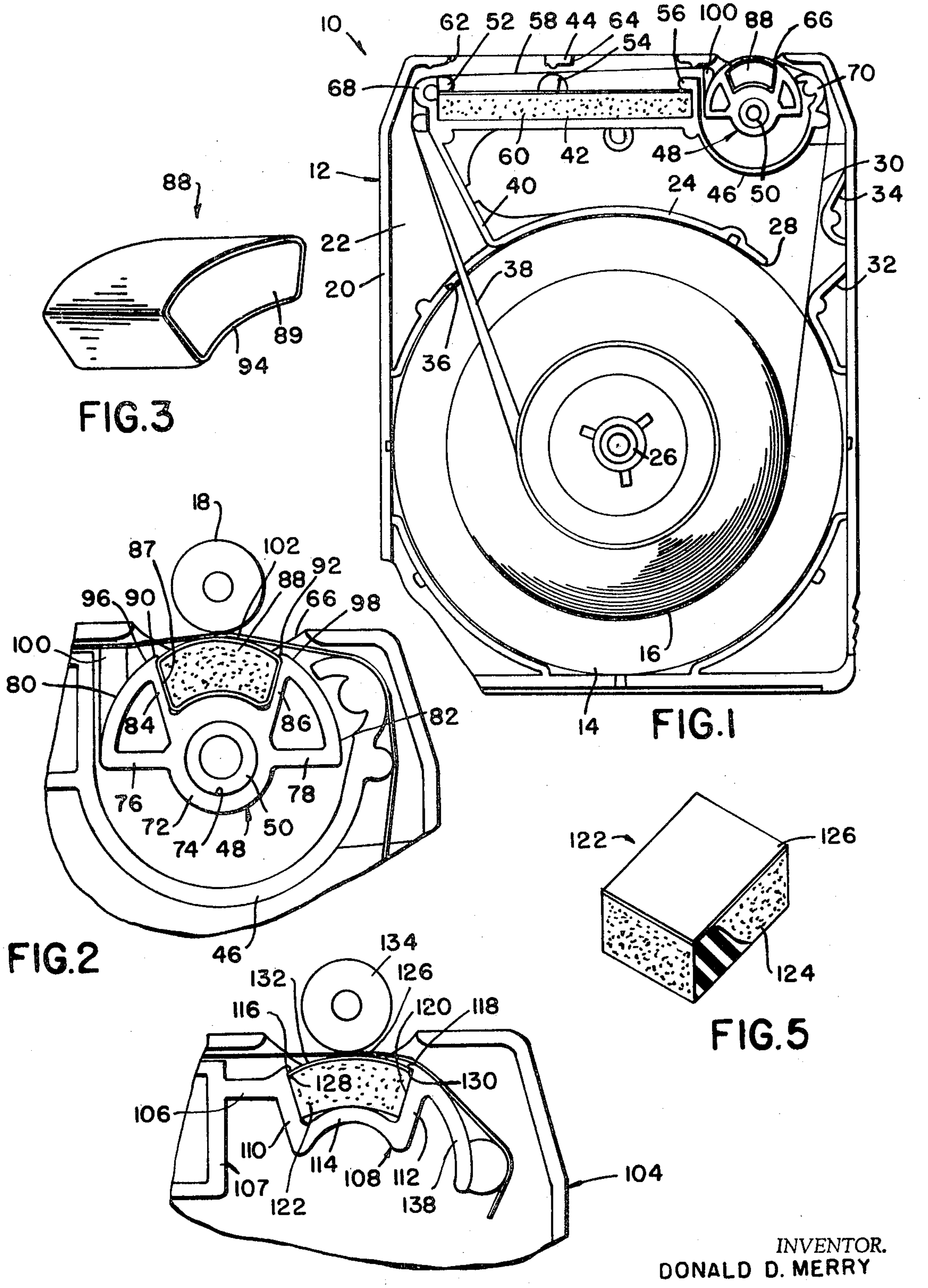
FIG. 1 is a plan view of an assembled cartridge forming one embodiment of the present invention with the cover removed for the purpose of clarity.
FIG. 2 is an enlarged view of the tape drive mechanism of the cartridge.
FIG. 3 is a view in perspective of an insert forming part of a fixed member which coacts with the tape driving element.
FIG. 4 is an enlarged view of another embodiment of the tape driving mechanism.
FIG. 5 is a view in perspective of another embodiment of the insert.

The magnetic tape cartridge 10 shown in FIG. 1 comprises a casing 12 in which is mounted a spool 14 upon which is wound a reel of magnetic recording tape 16 which is arrayed in endless fashion. The tape 16 may be of the stereo or single track type and normally will have recorded thereon various musical compositions for replay through a speaker system.

Such tape cartridges are commonly utilized in automobiles. The reply apparatus in the automobile may be mounted on the dashboard. A slot is provided in the dashboard to receive the cartridge 10. A magnetic pickup structure (not shown) and drive wheel 18 (illustrated in FIG. 2) are provided within the replay structure. The replay structure includes an amplifier and power means to drive a speaker system. The present invention is concerned with the tape drive mechanism.

The cartridge casing 12 has a rectangular configuration with the sides being longer than the ends. The cartridge 10 is relatively thin, just being thick enough to accommodate the spool 14 without causing interference or sliding contact with the edges of the tape 16. The casing is preferably fabricated of a tough, low-cost plastic material and may be injection molded. The casing 12 comprises two casing halves consisting of the base 20 illustrated and a cover (not shown). The base and cover are securely snap-fastened together by means of structure which is formed integrally therewith.

The base 20, which carries all of the working parts of the cartridge, comprises a backwall 22 having upstanding sides and end wall structures. A cylindrical wall structure 24 is provided within the base 20 substantially tangent to three of the walls of the base.

A hub 26 is provided on the backwall 22 in the center of the cylindrical wall 24. The hub 26 rotatably receives the spool 14. A U-shaped notch 28 is provided in the cylindrical wall 24 for passage of the returning tape section 30. A pair of spaced apart V-shaped wall structures 32, 34 extend inwardly from the casing sidewall to form a guide for the returning tape section 30.

A V-shaped notch 36 is provided in the cylindrical wall 24 for passage of the exiting tape section 38. The tape section 38 is drawn from the spool at the center thereof and is twisted at an angle as will be noted in FIG. 1. The angle of the edge of the notch 36 which contacts the tape matches the twist in the tape to provide a guide surface therefor.

A wall 40 extends from the notch 36 towards the adjacent corner of the base 20. The wall 40 terminates short of the corner and merges with a wall 42 which extends parallel to the end wall 44. The wall 42 terminates short of the opposite side of the base and merges with an arcuate wall section 46 which serves as a housing for a substantially fixed tape drive member 48 over which the tape passes as will be noted in FIGS. 1 and 2. A hub 50 is provided for reception of the member 48.

Three notched spaced apart walls 52, 54, 56 extend perpendicularly from the wall 42 and terminate short of the end wall 44 to permit passage of the forward playing tape section 58. The forward portions of these walls are rounded for smooth sliding of the tape. Similar curved projections are provided on the inner surface of the end wall 44, also for smooth passage of the tape. An elongated sponge rubber guide element 60 is received in the notches of the walls 52, 54, 56. A slippery plastic surfacing is provided on the forward face of the guide element 60 for the smooth passage of tape. A pair of openings 62, 64 are provided in the end wall 44 for insertion of the pickup structure of the replay mechanism. A circular notch 66 is provided in the end wall 44 for insertion of the drive wheel 18. Arcuate guide structures 68, 70 are provided at each end of the forward portion of the casing to direct the forward tape section 58.

Referring now to the tape drive mechanism, it will be noted that the tape drive member 48 defines substantially a semicylindrical holder member. The tape drive member 48 is preferably fabricated of a tough plastic material such as styrene. The central section 72 of the member 48 is cylindrical in form and has a central opening 74 for reception on the hub 50. A pair of spaced apart triangularly shaped sections 76, 78 extend radially outwardly from the center section 72. The outer surfaces 80, 82 are circular in cross section. The walls 84, 86 define an opening 87 for reception of an insert 88. A lip 90, 92 is provided at the outer end of each of the walls 84, 86 to overlap the insert 88 and retain it in place.

As will be noted in FIG. 3, the insert 88 has a generally arcuate shape with curved outer and inner walls joined together by inwardly angled sidewalls. In general, the cross section of the insert 88 matches the configuration of the recess 87 so that the insert will be snugly received in the recess. A sleeve 94 of slippery, flexible plastic, such as Mylar, is received over the body 89 and conforms to the shape thereof. The sleeve 94 may be, for example, 1 mil in thickness. The body 89 is preferably fabricated of a tough, relatively hard resilient material such as silicone rubber having an 80 durometer.

The surface areas 96, 98 of the sections 76, 78 adjacent the insert 88 have a high polish to provide a low coefficient of friction. An armlike projection 100 extends substantially tangentially outwardly from the triangular section 76. The projection 100 serves to limit pivoting of the member 48 and also as a guide for the tape.

In operation of the drive mechanism, the drive wheel 18 is driven by a prime mover in a direction to advance the tape causing timed movement of the tape past the magnetic pickup structure. New sections of tape are unwound from the spool 14 and return sections are rewound on the spool as is conventional. The surface of the drive wheel 18 has a sufficiently high coefficient of friction, as is conventional, to contact and drive the tape. The tape slips over the outer surface 102 of the insert 88. The member 48 is capable of only relatively limited pivoting and, once the drive wheel is started, the member 48 assumes a fixed position.

The tape drive mechanism thus described has a number of advantages over the conventional system in which a rotatable cylindrical driving wheel is used in place of the tape drive member 48. For example, the cost of such driven wheels forms approximately 25 percent of the total cost of the cartridge 10. The member 48 is capable of manufacture at a cost of less than one-half of such wheels, thus resulting in a saving of more than 12½ percent on the overall cost of the cartridge. Further, the use of a fixed member such as the member 48 improves operating reliability of the cartridge as a result of the elimination of a moving part. The tape drive member 48 may be utilized in any standard tape cartridge design thus permitting widespread use in existing cartridge designs. Further, use of the fixed tape drive member 48 in standard cartridge designs will standardize the pinch point configuration for all cartridge designs with regard to the area and amount of contact of the drive wheel 18. An additional advantage of this construction is that the fixed nature of the member 48 results in the maintenance of a constant pressure because, by eliminating the rotating wheel, the eccentricity inherent in a rotating component is also eliminated.

FIGS. 4 and 5 illustrate an embodiment of the invention in which the fixed drive member is made integral with the cartridge casing. FIG. 4 illustrates the upper right-hand portion of a cartridge casing 104. The portions of the casing not shown are the same as described in connection with FIG. 1. In FIG. 4, a horizontally extending wall section 106 protrudes at substantially right angles from the wall 107. The wall section 106 serves as a web to connect a generally W-shaped structure 108 to the casing. The structure 108 includes inwardly angled sidewalls 110, 112 which are oriented on radii of an imaginary circle forming a cylinder similar to the cylinder defined by the member 48 described in connection with FIG. 1. The walls 110, 112 are connected at their inner ends by an arcuate wall section 114. Inwardly extending lips 116, 118 are provided on the outer edges of the walls 110, 112 whereby the structure forms a holder member defining a recess 120 having the same shape as the recess 87 of the tape drive member 48.

The recess 120 may receive an insert in the shape of the insert 88. However, another embodiment of an insert is illustratively mounted in the recess 120. The insert 122 is best illustrated in FIG. 5. The insert comprises a blocklike body 124 fabricated of a resilient material of the type previously described, such as silicone rubber. A sheet 126 of slippery plastic material is adhered to one face of the body 124. As will be noted, the sheet 126 extends into flush arrangement with the sides of the body 124. It is important that this condition be true so that when the insert is mounted in the recess 120, the marginal edges 128, 130 of the sheet 126 will lie beneath the lips 116, 118. When the insert is slipped into the recess 120, it is deformed by engagement with the lips 116, 118 to assume an arcuate shape as illustrated. The outer surface 132 is deformed into an arcuate shape so that proper contact with the drive wheel 134 will be obtained to drive the tape 136 in the manner previously described. An arcuate guide wall 138 extends rearwardly from the outer edge of the wall 112 to act as a guide surface for the exiting tape.

What I claim as my invention is:

1. A tape cartridge containing a rotatable spool having a reel of magnetic tape in endless array, a casing mounting the spool, guide means in the casing over which a loop portion of the tape is guided for transportation past a reproducing head, drive means for the tape comprising an opening in the casing for insertion of a power-driven rotating wheel, a drive member mounted in the casing in alignment with said opening, said drive member including a holder element made from a tough plastic material having a recess therein facing said opening and a relatively hard resilient body located in said recess, said recess having a curved bottom surface with flat surfaces at the sides thereof extending outwardly therefrom, the surface on said body facing said opening being curved and being provided with a relatively thin sheet of plastic material, said last-mentioned surface having a generally circular configuration for abutment with the power-driven rotating wheel and with a tape section passing therebetween, said curved surface being slippery to facilitate the tape sliding thereover upon being driven by the power-driven rotating wheel, the side and inner surfaces of said body generally conforming to the shape of said recess with the surfaces on said body abutting the bottom and side surfaces of said recess, said holder element including a lip structure extending into the area of said recess engageable with the curved surface on said body to retain said body in a generally fixed position in said recess.

2. The tape cartridge defined in claim 1, further characterized in that said holder element is integral with an fixedly carried by said casing, said body being, in the undeformed state, generally block-shaped, said body being received in said recess and being deformed thereby to conform generally to the shape of said recess.

3. The tape cartridge defined in claim 1, further characterized in that said holder element is removably received in said casing, said casing having a hub element, said holder element having an opening and being received on said hub element, and stop means on the holder element engageable with an abutment on said casing to restrain pivoting thereof.

* * * * *